United States Patent
Jamet

[11] Patent Number: 6,052,501
[45] Date of Patent: Apr. 18, 2000

[54] CABLE COMPRISING OPTICAL FIBRES ENCLOSED IN AN OUTER SHEATH

[75] Inventor: Patrick Jamet, Marolles-sur-Seine, France

[73] Assignee: SAT (Société Anonyme de Télécommunications), Paris, France

[21] Appl. No.: 08/983,356

[22] PCT Filed: Jul. 12, 1996

[86] PCT No.: PCT/FR96/01088

§ 371 Date: Jan. 12, 1998

§ 102(e) Date: Jan. 12, 1998

[87] PCT Pub. No.: WO97/03375

PCT Pub. Date: Jan. 30, 1997

[30] Foreign Application Priority Data

Jul. 13, 1995 [FR] France .................................. 95 08535

[51] Int. Cl.⁷ .................................................. G02B 6/44
[52] U.S. Cl. ............................................................ 385/102
[58] Field of Search ..................................... 385/100–114

[56] References Cited

U.S. PATENT DOCUMENTS

| | | | |
|---|---|---|---|
| 4,844,575 | 7/1989 | Kinard et al. | 350/96.23 |
| 5,050,957 | 9/1991 | Hamilton et al. | 385/113 |
| 5,838,864 | 11/1998 | Patel et al. | 385/113 |

FOREIGN PATENT DOCUMENTS

| | | |
|---|---|---|
| 0286349 | 10/1988 | European Pat. Off. . |
| 0373846 | 6/1990 | European Pat. Off. . |
| 3815565 | 11/1989 | Germany . |

*Primary Examiner*—Hung N. Ngo
*Attorney, Agent, or Firm*—Griffin, Butler, Whisenhunt & Szipl, LLP

[57] ABSTRACT

The cable includes optical fibers (1) enclosed in an outer sheath (2) having elongate reinforcing members (4) embedded therein, disposed in two diametrically opposite groups (3) each comprising a plurality of mutually tangential reinforcing members (4).

1 Claim, 1 Drawing Sheet

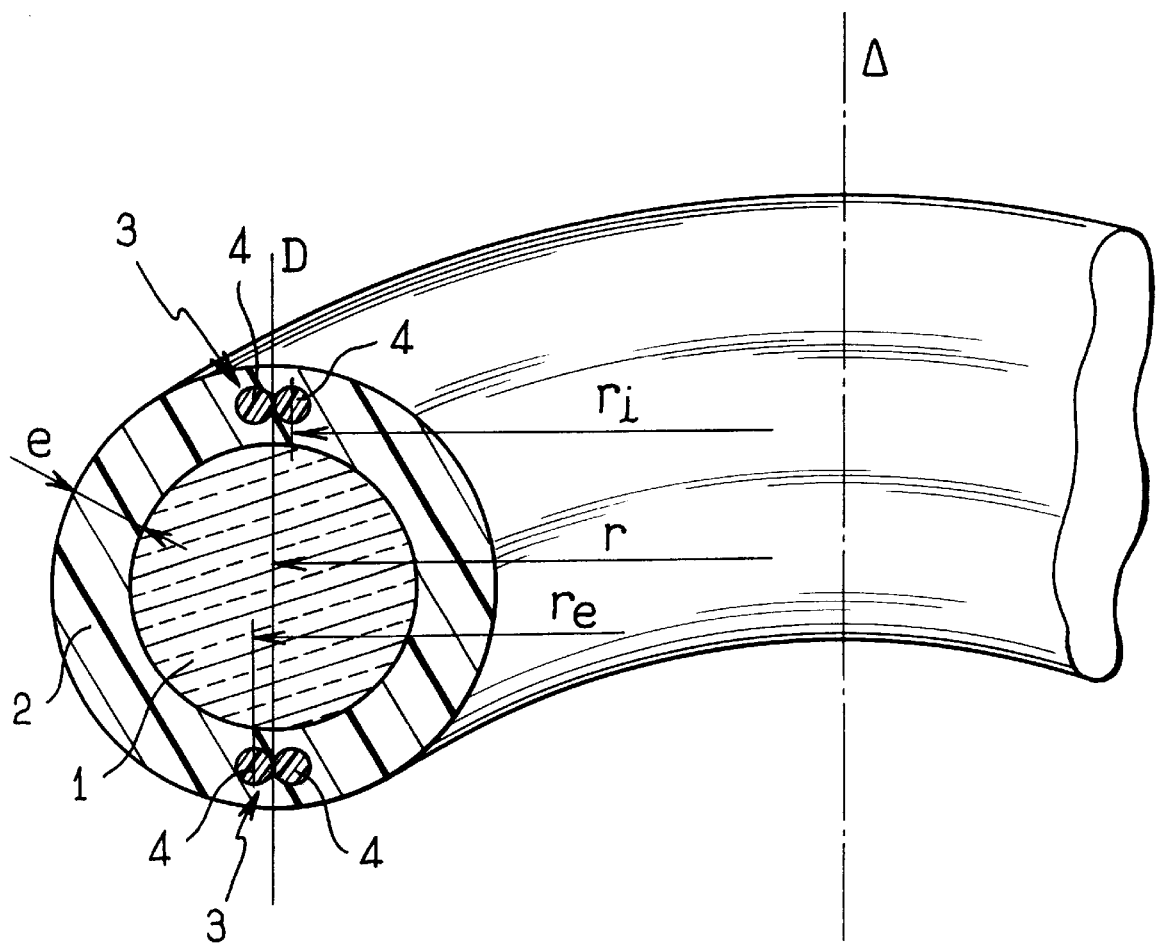

CABLE COMPRISING OPTICAL FIBRES ENCLOSED IN AN OUTER SHEATH

The present invention relates to a cable including optical fibers enclosed in an outer sheath.

BACKGROUND OF THE INVENTION

In the cable industry, it is well known that optical fibers must not suffer mechanical stress if both their transmission performance and their lifetime are not to be degraded.

To limit traction stresses on optical fibers while cables are being laid, or during temperature variations which cause expansion or retraction of the optical fibers, it is known to use reinforcing members which may be central or peripheral. In the case of a central reinforcing member it is generally necessary to twist the optical fibers or the elements containing the optical fibers. This slows down the rate of production and increases the cost of the cable obtained.

To avoid the twisting operation, it is known to make an optical fiber cable by enclosing a bundle of optical fibers in an outer sheath having reinforcing members embedded longitudinally therein. When a cable of this type is subjected to bending, the reinforcing members which are located on the outside of the bend relative to the middle of the cable, are lengthened by an amount that increases with increasing diameter of the cable. This results in resistance of the cable to bending and in the risk of the reinforcing members breaking if the force applied to the cable is greater than a force which causes the outermost reinforcing members to lengthen to breaking point.

To avoid that problem, it has been envisaged in document DE-A-38 15565 to dispose only two diametrally opposite reinforcing members, or even to dispose diametrally opposite reinforcing members in groups including three spaced-apart reinforcing members or four reinforcing members arranged in a housing filled with a material having a low coefficient of friction to enable the reinforcing members to move relative to the sheath. However, in the case of spaced-apart reinforcing members it is not possible to bend the cable about an axis parallel to the line interconnecting the reinforcing members without subjecting the reinforcing members to differential elongation which risks causing them to break. Furthermore, in the case of reinforcing members disposed in a housing, the outer sheath does not participate in the traction force and it is thus necessary to provide a greater number of reinforcing members. In both cases the sheath in which the reinforcing members are embedded must itself be relatively thick, thereby reducing the bending capacity and reduces the compactness of the cable.

OBJECTS AND SUMMARY OF THE INVENTION

The invention provides a cable including optical fibers enclosed in an outer sheath having elongate reinforcing members embedded therein, disposed in two diametrally opposite groups, each comprising a plurality of adjacent reinforcing members, wherein the reinforcing members in each group are mutually tangential.

Thus, in allowing the cable to bend about an axis parallel to a line interconnecting the two groups of reinforcing members, it is possible to obtain a total cross-section of reinforcing members in which the diameter of each reinforcing member is reduced and, consequently, the thickness of the outer sheath is reduced. The bending capacity of the cable is thus increased.

Furthermore, the distance of the reinforcing members from the middle of the cable is minimized, and the differential elongation between the reinforcing members is consequently minimized, thereby allowing greater bending.

According to an advantageous aspect of the invention, the number of reinforcing members of each group is selected so that when the cable bends around the minimum radius of curvature of the cable about an axis parallel to a line interconnecting the two groups of reinforcing members, the reinforcing member subjected to the greatest stress is elongated by an amount that is less than the breaking elongation of said reinforcing member. There is thus an optimum compromise between the number of reinforcing members that allow the thickness of the outer sheath to be minimized and the stresses to which the reinforcing members are subjected.

BRIEF DESCRIPTION OF THE DRAWING

Other characteristics and advantages of the invention appear on reading the following description of a particular non-limiting embodiment of the invention, given with reference to the accompanying sole FIGURE, which is a perspective view of the end of a cable of the invention in a bent position.

MORE DETAILED DESCRIPTION

In FIG. 1, the cable of the invention includes a bundle of optical fibers 1, the structure of which is not shown in detail, but which may, for example, be made in the form of one or more groups of optical fibers held together by holding sheaths as described in document FR-A-2 665 266. The bundle of optical fibers is enclosed in an outer sheath 2 having two groups 3 of reinforcing members 4 embedded therein. The groups 3 are diametrally opposite and each comprises two mutually tangential reinforcing members 4 disposed either side of a line D passing via the middle of the bundle of optical fibers. The reinforcing members are made of conventional materials such as metal wires, or strands of glass fiber or aramid, stiffened by a resin having a high traction modulus and a low coefficient of thermal expansion.

By disposing two reinforcing members side by side in each group, it can be seen that for the same total reinforcing member cross-section as would be required using only two diametrally opposite reinforcing members, it is possible to use reinforcing members having a diameter that is divided by 1.4 relative to the diameter that would be necessary with only two diametrally opposite reinforcing members. The thickness of the outer sheath is thus considerably reduced compared with the thickness of an outer sheath in which only two reinforcing members are embedded.

In addition, if $r$ designates the average radius of curvature of the cable about an axis $\Delta$ parallel to the line D, if $r_i$ designates the average radius of curvature of the reinforcing member 4 that is radially inside the line D, and if $r_e$ designates the average radius of curvature of the reinforcing member that is radially outside the line D, and if the reinforcing members all have a diameter equal to half the thickness of the outer sheath 2, then:

$$r_i = r - \tfrac{1}{4}e$$

and $$r_e = r + \tfrac{1}{4}e$$

from which the differential elongation can be deduced as follows:

$$(r_e - r_i)/r = \tfrac{1}{2}e/r$$

By way of example, differential elongation of only 1.2% is obtained when r=50 mm and e=1.2 mm, whereas it is generally accepted that breaking elongation is about 5%.

By arranging reinforcing members in diametrally opposite groups of adjacent members, the stresses on the diametrally opposite reinforcing members are not unduly increased, whereas the thickness of the outer sheath is decreased substantially.

The number of reinforcing members of each group could be increased without going beyond the ambit of the invention.

It can be seen, however, that in that case, the outermost fiber furthest from the line D is subjected to greater stress than are the other fibers and it is thus necessary to ensure that, for a minimum radius of curvature of the cable, the reinforcing member subjected to the greatest stress is elongated by an amount that is less than its breaking elongation.

Naturally, the invention is not limited to the embodiment described and variants thereof come within the ambit of the invention as defined by the claims.

I claim:

1. A cable including optical fibers (1) enclosed in an outer sheath consisting in a flexible layer (2) in which elongated reinforcing members (4) are disposed in two diametrically opposite groups (3) each comprising two reinforcing members (4) embedded in said flexible layer and distant from surfaces thereof, said two reinforcing members of each group being tangential to each other.

* * * * *

UNITED STATES PATENT AND TRADEMARK OFFICE
CERTIFICATE OF CORRECTION

PATENT NO. : 6,052,501  
DATED : April 18, 2000  
INVENTOR(S) : Wieser et al.

Page 1 of 2

It is certified that error appears in the above-indentified patent and that said Letters Patent is hereby corrected as shown below:

Col. 5, lines 7 and 8, "A particularly" should read --Particularly--.

Col. 5, line 39 after "mixture" insert --of--.

Col. 7, line 1, "use." should read --be used.--

Col. 9, line 51, after "continuum" insert --,--.

Col. 10, line 8, after "1" delete --,--.

Col. 10, line 52, "so called" should read --so-called--.

Col. 10, line 55, "so called" should read --so-called--.

Col. 11, line 6, "so called" should read --so-called--.

Col. 11, line 9, "were" should read --was--.

Col. 11, line 17, "so called" should read --so-called--.

Col. 11, line 19, in the formula, "$I_{80}$" should read --$I_{S0}$--.

Col. 11, line 20, "$I_{50}$" should read --$I_{S0}$--.

Col. 13, line 38, "Lyman-a" should read -- Lyman-$\alpha$--.

Col. 13, line 62, "kev" should read --KeV--.

UNITED STATES PATENT AND TRADEMARK OFFICE
CERTIFICATE OF CORRECTION

PATENT NO. : 6,052,501
DATED : April 18, 2000
INVENTOR(S) : Wieser et al.

It is certified that error appears in the above-indentified patent and that said Letters Patent is hereby corrected as shown below:

Col. 13, line 63, "kev" should read --KeV--.

Col. 15, line 13 "is" should read --are--.

Col. 16, line 50, "Lyman-a" should read -- Lyman-α--.

Col. 17, line 57, delete "and".

Col. 18, line 35 "an" should read --a--.

Col. 18, line 54 "an" should read --a--.

Signed and Sealed this

Twenty-seventh Day of March, 2001

Attest:

NICHOLAS P. GODICI

Attesting Officer

Acting Director of the United States Patent and Trademark Office